United States Patent

[11] 3,583,266

[72] Inventor Kazuyoshi Kondo
22-12, Hirosawa 1-chome, Hamamatsu, Shizuoka Prefecture, Japan
[21] Appl. No. 812,584
[22] Filed Apr. 2, 1969
[45] Patented June 8, 1971
[32] Priority Apr. 11, 1968, July 10, 1968
[33] Japan
[31] 43/24253 and 43/48221

[54] SHEARING PROCESS
6 Claims, 6 Drawing Figs.
[52] U.S. Cl. ................................................. 83/51, 83/55, 83/685
[51] Int. Cl. .................................................. B26f 1/02
[50] Field of Search........................................... 83/14, 19, 20, 21, 39, 49, 51, 55, 123—128, 685

[56] References Cited
UNITED STATES PATENTS
| | | | |
|---|---|---|---|
| 2,039,842 | 5/1966 | Howland-Shearman | 83/14 X |
| 2,141,492 | 12/1938 | Southwick | 83/126 X |
| 2,508,758 | 5/1950 | Hollerith | 83/51 |
| 2,648,383 | 8/1953 | Hahn | 83/39 X |
| 3,119,292 | 1/1964 | Schmid | 83/128 X |
| 3,211,034 | 10/1965 | Andris | 83/128 X |

Primary Examiner—James M. Meister
Attorney—Otto John Munz

ABSTRACT: A shearing process which comprises the steps of placing a blank between a die tool and another die tool disposed opposite thereto which has the same contour as the former but is formed with a protrusion that has a horizontal plane portion at the top thereof; then moving the die tool and the protruded tool with respect to each other in the direction where the distance between the two is shortened thereby shearing off a part of the plate thickness of the blank by one of the two die members, and then actuating a knockout disposed adjacent said die tool or protruded tool so as to separate the shorn article from the blank.

INVENTOR.
KAZUYOSHI KONDO

BY
ATTORNEY

INVENTOR.
KAZUYOSHI KONDO
BY
ATTORNEY

SHEARING PROCESS

BACKGROUND OF THE INVENTION

This invention relates to an improved shearing process which uses an opposing pair of dies and knockout.

Shearing in the usual way results in crowding (or edge sinking) fracturing and burring on the sheared surface, which may badly mar the profile of the sheared portion. It has therefore been deemed advantageous to eliminate such defects and to obtain a smooth sheared surface. A number of shearing techniques recently developed are based on the concept of suppressing the occurrence of cracks by increasing the hydrostatic pressure which is applied to the material in the immediate vicinity of the shearing edge. These methods can effectively inhibit the production of a fracture, but their common principle is hardly applicable to materials that have relatively poor ductility. In addition, burring cannot be adequately prevented.

And, where the contour of the blank is complex, for example, sharply pointed, deep crowding cannot be prevented. On the other hand, the use of a cutting mechanism has been proposed as another means of forming a smooth portion in the sheared surface. The technique of shaving is one of the approaches for forming a smooth sheared surface with a cutting mechanism, but it has a major disadvantage in that its use is limited to applications which involve very short stock lengths.

SUMMARY OF THE INVENTION

It is a fundamental object of the present invention to provide a fine shearing process which produces less crowding and a workpiece substantially devoid of fractures and burrs.

Another object of the present invention is to provide a fine shearing process where a workpiece is shorn with an ordinary die or punch and a tool having a protrusion formed with a horizontal plane portion on the top but otherwise of the same configuration as the die or punch and is disposed opposite thereto, and final where the shearing is accomplished by means of a knockout.

Still another object of the invention is to provide a fine shearing process which permits a smooth removal of the stock so that the process is readily applicable to a wide range of working conditions while pursuing the above objects.

These and other objects and advantages of the present invention will be better understood from the following detailed description of the present invention taken in conjunction with the accompanying drawings.

Details of the invention

Figure 1:
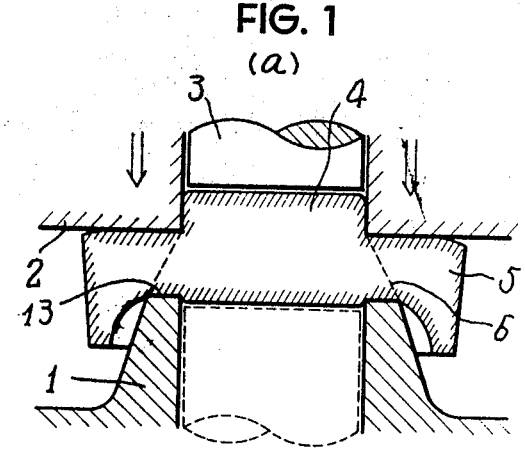
FIG. 1a is a sectional view explanatory of the principle of the present invention as applied to the blanking of a disc and showing a die in a somewhat descended position with respect to a blank.
FIG. 1b is a sectional view showing the die in a further descended position with respect to the blank.
Figure 1:
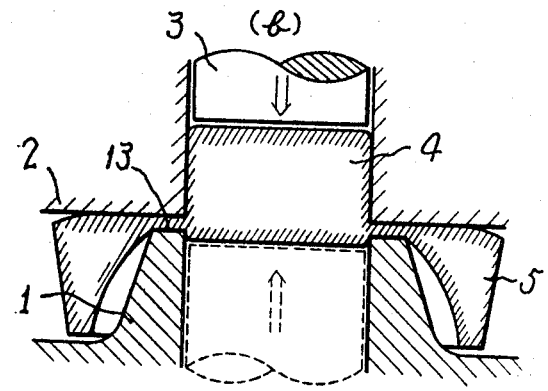

According to the shearing process of the present invention, the die or punch that is employed for the usual shearing operation is replaced by the following. For the purpose of blanking, an arrangement of elements as shown in FIGS. 1a and 1b which consists of a die 2, a protruded die 1 disposed opposite to the die, and a knockout 3 is used. In the instance of punching, as shown in FIG. 2, another arrangement of elements, that is, a punch 8, an additional punch 7 with a protrusion disposed opposite thereto, a knockout 9 and an ejector 10 is employed.

The present invention is characterized by the use of such an opposing tool with a protrusion. Substantially the same principle of the invention that governs blanking is applicable to punching as well. Therefore, the operation of the tools that will be described below will concern principally the blanking technique as illustrated in FIGS. 1a and 1b. Of course, substantially the same description applies to shearing along straight-line or open curve contours.

FIG. 1a shows the die 2 in a somewhat descended position with respect to a blank 4. Here a deformation plane 6 due to shearing is initially formed in the plane of material that connects the edge of die 2 and the outer edge of protruded die 1, and then the cutting proceeds from the die edge side solely by means of a cutting mechanism. With the progress of this operation to the extent that the distance between the face of the die 2 and the plane portion of the protruded die 1 becomes smaller than the width of the plane portion 13 at the top of the protrusion, the deformation is shifted to a mechanism like a flat plate compression, and the protruded die 1 also begins to take part in the cutting. (See FIG. 1b.)

After this step of flat plate compression, the working force sharply increases and eventually the separation of the blank 4 is made impossible. However, the blank 4 can be easily separated if the knockout 3 is allowed to work in a sufficiently advanced stage of the above step. The knockout 3 moves in the directions indicated by full and broken lines in FIG. 1b. In this separating step, the stock 5 is compressed between the two dies 1 and 2 and is subjected to a hydrostatic pressure high enough to preclude any possibility of forming a fracture.

Also, in this case the die 1 penetrates to a certain depth thereby to inhibit the production of burr. If the timing for working of the knockout is advanced, it may sometimes happen that the protruded die 1 fails to penetrate adequately. Even in such a case, however, burrs will not result if the working direction of the knockout 3 is in the direction indicated by arrow mark in solid line in FIG. 1b.

The point of time at which the knockout begins working is desirably delayed wherever possible in order to avoid cracking of the blank. However, in any case where the resistance to removal of the stock is great, part of the material on the stock side may be forced into the blank toward the end of the process step. A blank with a less depth of cut on the side of the protruded tool may swell at the edge, and in view of this the timing for the operation of the knockout must be advanced.

In operations where it is possible to accomplish the cutting by the two dies or punches adequately and to shorten the length of the work portion to be cut off by the knockout, the knockout 3 or 9 may be caused to work under the urging of spring or rubber member etc. so that the blank 4 or 11 can be separated from the material. In this way all of the shearing operations of the present process can be conducted with a single action press.

More particularly, for example, in blanking work to obtain a disc that is approximately 1 mm. in thickness and 18 mm. in diameter, and if the opposing tool has a protruded top whose width is 30 percent of the sheet thickness, and the stock length is 80 percent of the sheet thickness, a fracture is produced when the operation of the knockout starts at the stage where the thickness of plate that is left uncut is more than 40 percent of the sheet thickness. Also the swell of the blank edge that is produced when the knockout operates at the stage where the thickness of plate that is left uncut, is less than 5 percent of the sheet thickness. Therefore, the timing for starting the operation of the knockout is preferable to adjust to the point where the thickness of plate that is left uncut, becomes 30 to 10 percent of the sheet thickness. This timing is changeable according to the conditions of the width of the protruded top and the stock length. But in most cases, it may be preferably adjusted to the point where the thickness of plate that is left uncut, is approximately 5 to 10 percent smaller than the width of the top plane 13 of the protrusion.

Referring to FIG. 2, numeral 7 indicates a punch provided with a protrusion, 8 a punch disposed opposite thereto, 9 a knockout, 10 an ejector, 11 a blank and 12 a stock.

In FIG. 2 the punch 8 is shown in a slightly lowered position with respect to the blank 11. As the punch 8 further descends to a point where the distance between the face of the punch 8 and the plane portion of the protruded punch 7 becomes less than the width of the plane portion 13 on the top of the protrusion, the deformation is shifted to a flat plate type compression and the protruded punch 7 also begins penetrating into the work. At a point where this step of operation has proceeded sufficiently the knockout 9 is lowered. Then, the blank 11 can be separated. The steps above described are substantially the same in principle with those of blanking shown in FIG. 1, excepting that the configuration of the protruded tool is different. The shape and the arrangement of the knockout 9 also are varied and an ejector element is introduced.

However, it is inevitable to provide positive means to permit the removal of the stock 12 and in the case of FIG. 2, a method of forming a prepunched hole 12' beforehand is employed.

In this case, it is rendered possible to remove by far a greater volume of stock than in a shaving operation.

Figure 3:
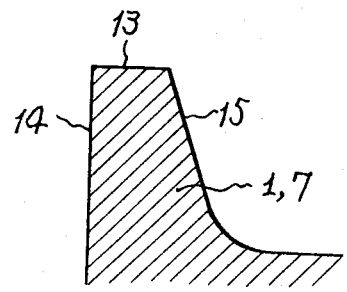
FIG. 3 is a view illustrating the configuration of a die tool provided with a protrusion.

The contour of the protrusion from the opposing tool as illustrated in FIG. 3 may be as follows. First, the contour of the blank along the flank 14 is used as a determinant. In the case of blanking, this part of opposing tool is shaped after the contour of the hole of die 2, and in the case of punching it is given the same size as the outside diameter of the punch 8.

The relieved side of the protrusion 15 is tapered so as not to prevent the removal of the stock.

The plane portion 13 at the top of the protrusion is provided to reduce the chance of fracture that may occur from the die edge and permit the die 2 or punch 8 to cut in the blank 4 or 11, whichever is the case, for the cutting operation. For this reason, the plane portion 13 must have a width above a certain dimensional range. However, if the width is too large the stock will be prematurely subjected to plane compressive deformation and the shearing force will increase. Since the starting time of the knockout 3 or 9 must be advanced, the force required for the knockout action will also be increased and the swell of the blank edge aforementioned will be apt to occur. It is therefore necessary to choose a suitable width, and the choice is made depending upon the configuration and material of the blank and other factors that satisfy the above requirements. For a number of materials, the range of width which is most strongly recommendable is about 30 to 40 percent of the thickness of the work plate. As a general rule good results are obtained by choosing a low value from the range for relatively soft material and a high value for relatively hard material. By way of exemplification, it has been ascertained that when a hard aluminum plate Grade 3 is shorn with a straight edge a plane portion 13 having a width which is more than 20 percent of the thickness of the blank can always give a smooth sheared surface free from fracture, regardless of the length of the stock.

It is convenient for tool making to make this plane portion 13 to be horizontal at a right angle to the flank of the die as shown in FIG. 2. But this plane portion may be suitably inclined toward the direction opening to the side where the stock is removed and within the range capable of realizing the cutting mechanism above described. The inclination may be up to about 20° for example.

Though it is troublesome to provide an inclination to the plane portion in tool making, this obviously does extend the applicable range of the present process because it promotes the removal of the stock during the later stage and delays the occurrence of the swell at the blank edge. Further, with respect to the use of the cutting mechanism, the setting of the inclination aforementioned is not permitted on the protruded die, but inclination can be set on the face of the plane die. In this case, the inclination of the face of the plane die serves as a rake angle of ordinary cutting tool. Of course, a lubricant with a coefficient of friction as small as possible must be chosen. Further it is also possible to add ultrasonic oscillation to the plane die to combine with the ultrasonic cutting. The reduction of the crowding, which is one of the features of the present process, is due to the utilization of the cutting mechanism.

Figure 2:
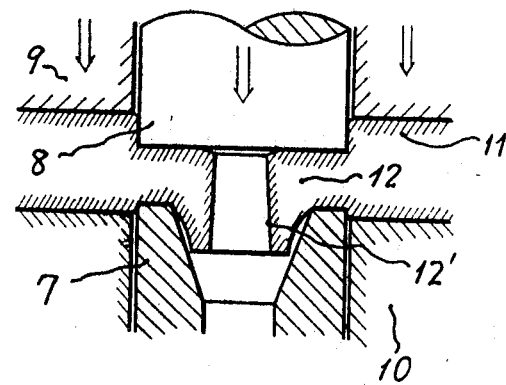
FIG. 2 is a view explanatory of the principle of the resent invention as applied to a punching work.

In FIGS. 1 and 2, the movements and actions of the tools are relative to each other, and either may be made movable. As for the knockout, it may be moved as well from the protruded die side, as indicated by dotted lines in FIG. 1. If the knockout is placed alongside the protruded tool and if a suitable initial position is set, the depth of cut by the protrusion into the plate is made adjustable.

This adjustment becomes necessary especially when the inclination is set on the plane portion of the protruded die as mentioned above. Further, it is possible to suppress dishing of the blank or lifting-off of the stock by using the knockout, placed alongside the plane die, or an ejector to apply the counter pressure against the blank or stock during the working period. These methods become unavoidable in some cases.

For the application of the present process, it is essential to facilitate the removal of the stock 5. Ordinarily stock removal presents no problem in shearing along an open curve contour but offers difficulties in shearing along a closed curve contour. There are various prior art methods for promoting stock removal. The present invention also provides a shearing process whereby the removal of the stock is accomplished with ease. A first method conceived for this purpose in the case of blanking is to form a strip having an extremely narrow frame portion and to make the feed of the strip as short as possible so that the stock can be divided by this portion during the shearing operation thereby to facilitate the discharge of the stock.

Figure 4:
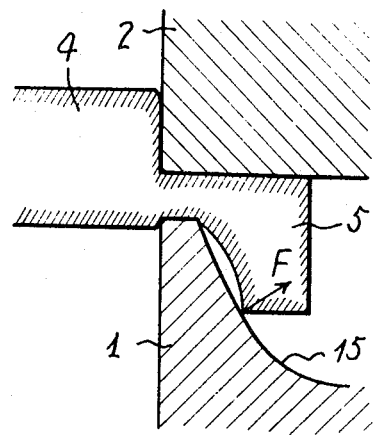
FIG. 4 is a sectional view explanatory of the means for facilitating the removal of the stock taking advantage of the relieved side of the die tool provided with a protrusion.
Figure 5:
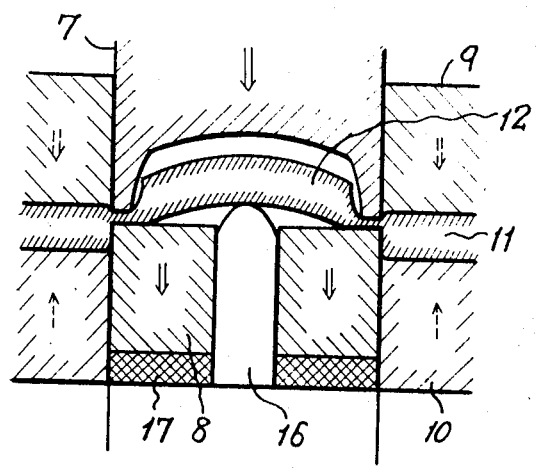
FIG. 5 is a sectional view explanatory of the means for facilitating the removal of the stock taking advantage of the protruding die tool as applied to the punching operation.

The method in the case of punching is to form a single prepunched hole or a suitable number of escape holes of suitable contour at points along the profile of the blank, and to cause deformation and division of the stock at these points thereby to facilitate the discharge of the stock as a whole. This method is suitable for articles of complicate configurations. A second method is to shape the relieved side 15 of the protruded tool so as to promote the discharge of stock. As illustrated in FIG. 4, this portion 15 can positively aid the stock 5 to be discharged during the operation by forcing the stock in the direction indicated by an arrow F. A third method that is intended for positive removal of stock during operation is to provide a protrusion on the face of the punch or die. For simplicity, punching is cited as an example. As illustrated in FIG. 5, a protruding portion 16 is provided in the facial, central portion of the punch 8. Then, prior to the cutting by the punch edge, the stock 12 is urged upwardly in the middle part and thereby dished. This protrusion contributes to a further increase in dishing as the stock 12 is subsequently forced toward the center by the cut-in of the punch edge. For added accuracy the protrusion 16 is made movable outwardly of the punch 8 by having an elastic seat 17 of a suitable strength, e.g., urethane or rubber, being placed under the punch 8. With such means, the punch 8 is forced down as shown with the rise of working force, and accordingly the protrusion 16 relatively protrudes thereby to intensify the dishing of the stock 12. If the front tip of the central part is sharply pointed, the protrusion can easily pierce through the stock 12. This makes the removal of the stock 12 easy regardless of whether prepunched holes are provided or not. In FIG. 5, reference numeral 7 designates an opposing punch formed with a protrusion, 9 a knockout, 10 an ejector, and 11 a blank. According to the opposing die shearing process of the present invention, the protrusion of the protruded tool is relatively small and the volume of the stock to be removed is not large. It is for this reason that the relatively simple method of promoting the dishing as described above can deal with the amount of material movement required for the removal of stock.

The above method is applicable to punching as well, in which case it is only necessary to provide in the face of the die a tool which acts to protrude with the progress of punching operation so as to help the lifting-off of the stock during the operation.

It is to be noted that the embodiments in FIGS. 2 and 5 illustrate arrangements for punching and, in particular, the structural elements, knockout 9 and ejector 10. After most of the material has been cut with the punch 8 and protruded punch 7, the knockout 9 descends while both punches are gripping the stock 12 in between, and forces down the ejector 10 which is faced under pressure with the product 11. This completes the final separation of the blank product 11 form the stock. Then, as the knockout 9 ascends to the original position, the product is ejected upwardly by the ejector 10.

The same functions of the knockout and ejector apply in blanking as illustrated in FIG. 1. Since it is assumed that the product is blanked out downwardly, no mention is made specifically of the ejector. But where the product is to be ejected up over the die surface, the tool indicated by dotted lines in FIG. 1 will serve as an ejector. It will be forced down by the knockout 3 and the product 4 facing therewith under pressure, and while the knockout is in its ascending stroke following the separation, the tool will function to eject the product upwardly.

As will be obvious from the description of page 8, lines 2 to 8 of the specification, the position where the knockout is set may be replaced for either blanking or punching operation. In such a case, the knockout and ejector change places with each other. The motion of the knockout for final separation is directed contrariwise or upwardly, and the ejector ejects the product downwardly.

According to the process of the present invention, shearing is accomplished in a state where the hydrostatic pressure of the deformable zone as a whole is kept relatively high by means of a cutting mechanism. As a consequence the blank is difficult to crack and, even if it cracks, the crack will always be directed toward the stock and thus no fracture will occur on the part of the blank.

The process of the invention is applicable to almost all of ordinary ductile and brittle industrial materials excepting particularly soft high-molecular materials such as vinyl plates. For example, it is applicable to soft aluminum material (AlP3-0), hard aluminum material (AlP3-H), copper (CuP2¼H), brass (BsP2¼H), mild steel (SPC3,S45C), phenolic laminates, epoxy resin, etc.

Theoretically there is no limit to the plate thickness of blank to which the shearing process of the present invention is applicable as far as the strength of the tools are permissible.

According to the present process, the working force required is substantially the same as in conventional shearing, and shearing can be accomplished with considerably less force than in other fine shearing processes. The working force above referred to is usually expressed in terms of shearing resistance $\tau b$ (kg./mm.²). The value is obtained by dividing the maximum value of working force by the cross-sectional area of the sheared profile. Various materials may be compared in respect of shearing force by determining the ratios $\tau b/\sigma b$ of those values to the values of tensile strength $\sigma b$ of the individual materials. as follows.

In blanking work assuming that the technician needs to obtain a disc having approximately 1 mm. in thickness and 18 mm. in diameter, and assuming further that the blank itself is disc-shaped, the stock length is 60 percent of the thickness of the sheet, and the opposing tool has a protrusion top whose width is 40 percent of the sheet thickness, then:

| Blank material | $\tau b/\sigma aqb$ |
|---|---|
| Al-H | 0.64 |
| Al-0 | 0.72 |
| Cu-¼H | 0.74 |
| Bs-¼H | 0.71 |

In the instance of Al-H blank, if the stock length becomes 80 percent of the sheet thickness, then $\tau b/\sigma b = 0.68$. If the blank is a strip instead of disc and the length of minimum stock portion is 80 percent of the sheet thickness, then $\tau b/\sigma b = 0.74$.

In ordinary blanking where the dimensional accuracy is not critical, it is usually considered reasonable to estimate the shearing resistance on the safe side at $\tau b/\sigma b = 0.8$. Accordingly, we may well regard the working force involved in this opposed die process as not distinguishing from the conventional shearing force. On the other hand, in a fine blanking process which may be said typical of precision shearing processes, the pure shearing resistance that is met in blanking a 1 millimeter-thick sheet of Al-0 is about the same as in the present process. But a counter holddown force of about two-thirds of the pure shearing resistance is added as a counter pressure. Further, a force about 4/3 times greater than the pure shearing resistance is required for the holder to force down the knife edge. Similar working force is considered necessary for other materials. Thus, according to the process of the invention, the working force required is at most about the same as in ordinary shearing processes, and shearing can be accomplished with fairly less working force than are needed in conventional fine shearing methods.

Therefore, this process is advantageous to the degree of tool wear and even if the tool edge were extremely worn the tool life can be prolonged because the wear of tool edges has relatively little effect upon the occurrence of burrs and the blank accuracy.

I claim:
1. A shearing process which comprises the steps of:
   placing a blank between a die tool and another die tool disposed opposite thereto which has the same contour as the former but is formed with a protrusion that has a horizontal plane portion at the top thereof;
   then moving the die tool and the protruded die tool with respect to each other in the direction where the distance between the two tools is shortened, thereby shearing off a part of the plate thickness of the blank by one of the two die tools,
   and then actuating a knockout disposed adjacent said die tool or protruded tool so as to separate the shorn article from the blank.
2. A shearing process as defined in claim 1 wherein the protruded die tool is provided with a protrusion of the same inner contour as the inner contour of the die tool.
3. A shearing process as defined in claim 1 wherein the die tool is a punch and the protruded die tool is provided with a protrusion of the same outer contour as the outer contour of the die tool.
4. A shearing process as defined in claim 2 wherein the outer side of the protrusion is sloped so that the stock formed during the working can be removed outwardly along the slope.
5. A shearing process as defined in claim 1 which includes a protruding portion or a die tool adapted to protrude with the progress of the shearing operation which is provided on the facial, central part of the punch so as to promote the dishing or lifting-off of the stock and to facilitate the removal thereof.
6. A shearing process as defined in claim 1 which includes a protruding portion or a die tool adapted to protrude with the progress of the shearing operation which is provided on the front part of the die tool so as to promote the dishing or lifting-off of the stock and to facilitate the removal thereof.